United States Patent [19]

Fostveit

[11] Patent Number: 4,513,176
[45] Date of Patent: Apr. 23, 1985

[54] TEST APPARATUS FOR TELEPHONE EQUIPMENT

[76] Inventor: Edgar H. Fostveit, 728 Railroad St., DeRuyter, N.Y. 13052

[21] Appl. No.: 470,490

[22] Filed: Feb. 28, 1983

[51] Int. Cl.³ .............................................. H04B 3/46
[52] U.S. Cl. ...................... 179/175.1 R; 179/175.2 C; 179/175.3 R
[58] Field of Search ......... 179/175.1 R, 175, 175.2 A, 179/175.2 B, 175.2 C, 175.25, 175.3 F, 81 R, 81 C, 175.3 R

[56] References Cited

U.S. PATENT DOCUMENTS

| 3,814,870 | 6/1974 | Miller | 179/175.2 B |
| 4,369,341 | 1/1983 | Ahuja | 179/175.2 C |
| 4,413,163 | 11/1983 | Basini | 179/175.1 R |
| 4,415,778 | 11/1983 | Turner | 179/175.1 R |

Primary Examiner—Stafford D. Schreyer
Attorney, Agent, or Firm—Bruns and Wall

[57] ABSTRACT

Test apparatus for use by a telephone company customer in his own home to determine whether trouble in his phone service originates in his equipment or that of the phone company. The test apparatus includes a multiple position switch and one or more test circuits connected to the switch. The switch knob is normally positioned so that telephone company's wiring junction is connected to the customer's wiring and telephone instruments. If trouble occurs, the switch can be moved to one of several other positions each of which is connected to a different test circuit having a visual or an audible indicator to indicate the source of the trouble.

11 Claims, 4 Drawing Figures

TEST APPARATUS FOR TELEPHONE EQUIPMENT

BACKGROUND OF THE INVENTION

This invention relates generally to telephone testing devices, and has particular reference to novel test apparatus for enabling a phone company customer who owns his own equipment to determine, in the event of trouble, whether the cause of the trouble is in his equipment or is in the service provided by the phone company.

Heretofore, the telephone equipment in a customer's home has usually been the property of the phone company and therefore when something has gone wrong with the service, the company has had the sole responsibility for making repairs. At the present time, for a number of reasons, the trend is strongly toward the customer owning the telephone equipment that is in his home. This creates a problem for the customer because if there is trouble with his service he presently has no way of knowing whether the cause of the trouble is in his equipment or that of the phone company.

If the trouble that occurs is in phone company equipment, it is the company's responsibility to repair it. However, if a company repairman is called to a customer's home to locate the source of the trouble and finds it in the customer's equipment, not only is the repairman not obligated to repair the equipment but the customer will be charged a substantial fee for the service call. There exists a need, therefore, for an apparatus that can be used by the customer himself when trouble occurs to determine in a straightforward, uncomplicated way whether the source of the trouble is in his own equipment or that of the phone company.

The applicant is not aware of any pertinent prior art, probably because customer ownership of telephone equipment is a relatively new development. A preliminary search was undertaken prior to filing the present application and this search developed U.S. Pat. Nos. 3,627,932; 3,711,661 and 4,356,353. These three patents are not believed to be pertinent to the test apparatus disclosed herein.

SUMMARY OF THE INVENTION

The present invention provides novel test apparatus that is adapted to be used by a telephone company customer in his own home to determine whether trouble in his phone service originates in his equipment or that of the phone company. It is contemplated that the test apparatus will be incorporated in the phone service close to the point where the service enters the customer's home. A wiring junction provided by the phone company is usually at or near this point. This junction is connected to an external telephone company line and is also connected to the customer's phone wiring and instruments. The test apparatus is preferably permanently incorporated in the service just inside the wiring junction and is connected to the customer's wiring in a manner to be fully described in the following disclosure.

The test apparatus of the invention includes a multiple position switch and one or more test circuits connected to the switch. The switch knob is normally positioned so that the telephone company's wiring junction is connected to the customer's wiring and telephone instruments and as long as there is no trouble with the service the switch will remain in this position. If, however, trouble occurs, the switch can be moved to one of several other positions each of which is connected to a different test circuit having a visual or an audible indicator to indicate the source of the trouble. When the switch is moved to any of its test circuit positions, the customer's telephones are disconnected from the wiring junction and the particular test circuit is connected to the junction.

The test circuits can include one for ascertaining whether or not there is telephone line continuity from the wiring junction back to the telephone company central office, another for ascertaining whether or not the telephone company's bell ringing voltage is being received at the wiring junction, and a third for ascertaining whether or not the telephone company's dial tone is being received at the wiring junction. The last mentioned test circuit also provides for a noise test, to be described.

DESCRIPTION OF THE PREFERRED EMBODIMENTS

Figure 1:
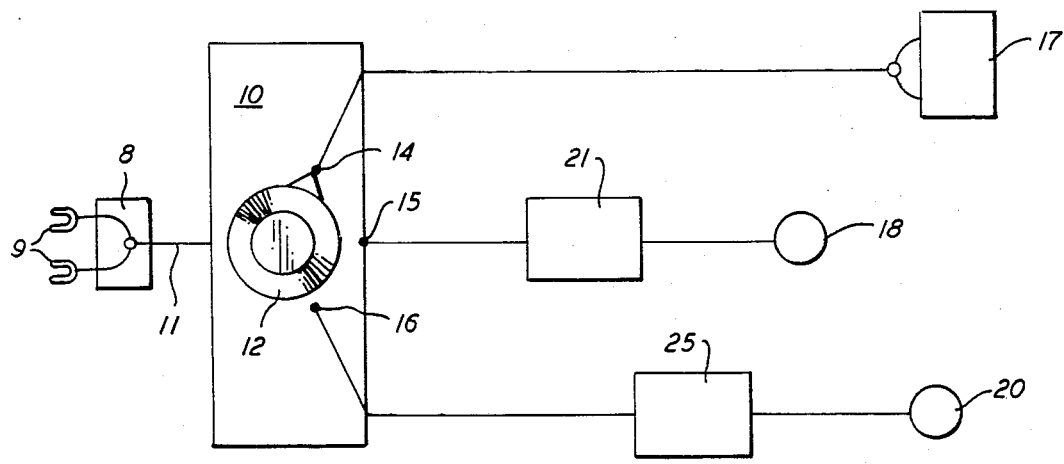
FIG. 1 is a block diagram of one embodiment of the test apparatus of the invention.
Figure 2:
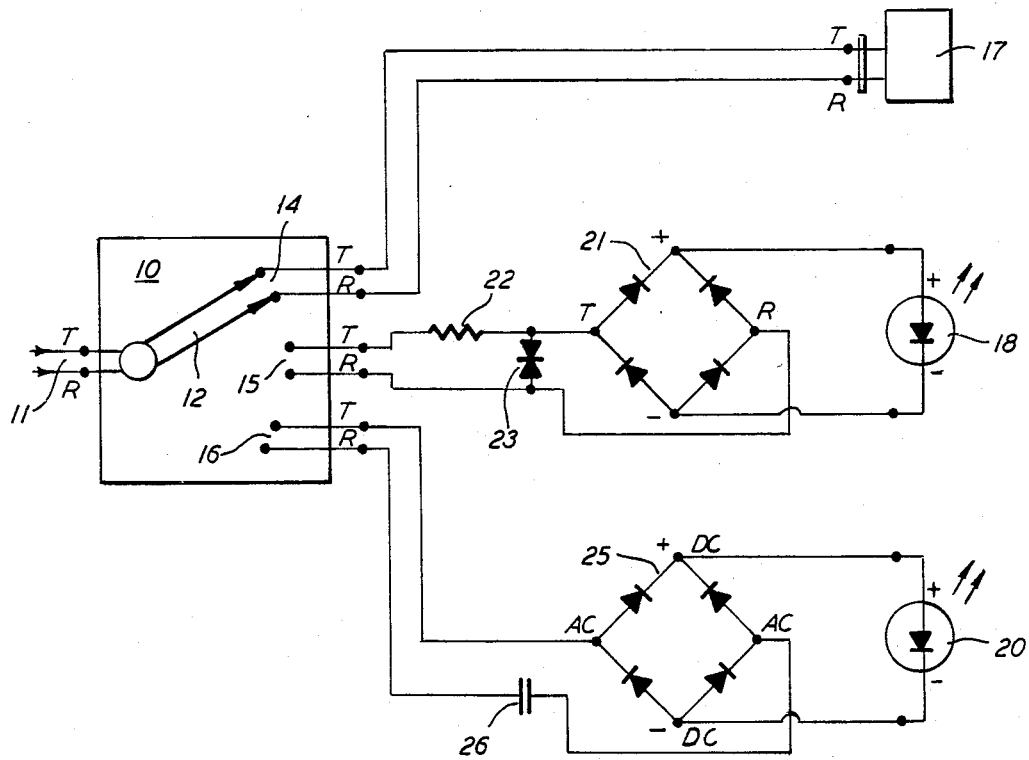
FIG. 2 is a schematic diagram for the embodiment of FIG. 1.

Referring now to the drawings, and with particular reference to FIGS. 1 and 2, the telephone company wiring junction is shown at 8, the junction having terminals 9 for connecting it to an external telephone company line (not shown). The wiring junction is usually located on the outside or just inside the customer's house and, without the present invention, would be directly connected to the customer's telephone wiring and instruments at various locations inside his house. The wiring junction 8 is also known as the "demarc point" because everything on one side of it is telephone company property and everything on the other side is the customer's property, at least in situations wherein the test apparatus of the invention would be utilized.

The test apparatus of the invention includes a multiple position switch 10 that preferably is located close to the wiring junction 8 and is connected thereto by a conducting cord 11. The switch 10 includes a selector knob 12 that can be rotated into three switch positions 14, 15 and 16. The first switch position 14 is the normal or usual position for the selector knob, and when the knob is in this position the switch operates to connect the wiring junction 8 to the customer's inside telephone wiring and telephone instruments indicated generally at 17.

As long as the customer has satisfactory telephone service, the selector knob 12 is kept in the first switch position 14. However, if the customer experiences trouble he can use the switch and associated test circuits to ascertain the source of the trouble and broadly the nature of the trouble. Thus, if the selector knob is moved to the second switch position 15, the test circuit connected thereto will visually indicate by means of a light emitting diode 18 whether or not there is telephone line continuity from the wiring junction 8 back to the telephone company's central office. In this connection, it is important to note that when the selector knob is moved into either of its second or third positions 15 or 16, the customer's wiring and telephones are disconnected from the wiring junction.

If the selector knob 12 is moved to the third switch position 16, the test circuit connected thereto will visually indicate by means of a light emitting diode 20 whether or not the telephone company's bell ringing voltage is being received at the wiring junction 8. In the second and third switch positions, if the corresponding light emitting diodes 18 and 20 light, it means that the telephone company's equipment is working properly and that the source of the trouble is in the customer owned equipment. If, in the second switch position 15, the lamp 18 does not light it means that the trouble is in the telephone company line and that the customer's equipment is probably not at fault. Similarly, if in the third switch position 16, the lamp 20 does not light it means that the telephone company's bell ringing voltage is not being received at the wiring junction and that the customer's equipment is probably working properly.

Referring now in particular to FIG. 2, the switch 10 is a three position, two-pole switch so that in each of its switch positions 14, 15 and 16 it completes the circuit connected thereto. The circuit connected to the second switch position 15, which is for testing line status or line continuity back to the telephone company office, includes in addition to the light emitting diode 18 a polarity guard diode-configuration 21 for protecting the polarity of the diode against possible telephone company line reversals by an installer. The circuit also includes a current limiting resistor 22 and a surge protector 23, the latter serving to protect the polarity guard 21 against transient noise bursts.

The circuit connected to the third switch position 16, which tests for the telephone company's bell ringing voltage at the wiring junction, includes an AC bridge rectifier 25 of conventional configuration. The circuit also includes a DC blocking capacitor 26 as shown. In connection with this circuit it will be understood that the telephone company's ringing voltage is an intermittent AC voltage superimposed upon the steady DC voltage. The AC voltage, which is usually in a 43–86 V. range, must be sufficient to ring a bell or bells. The test circuit will detect this AC voltage and convert it to DC voltage sufficient to illuminate the light emitting diode 20. The latter will turn on and off intermittently as it follows an approximate 2 second telephone company ringing interval. To use this circuit to test for ringing voltage, the customer will need to ask a neighbor to dial the customer's phone number at an agreed upon time.

Figure 4:
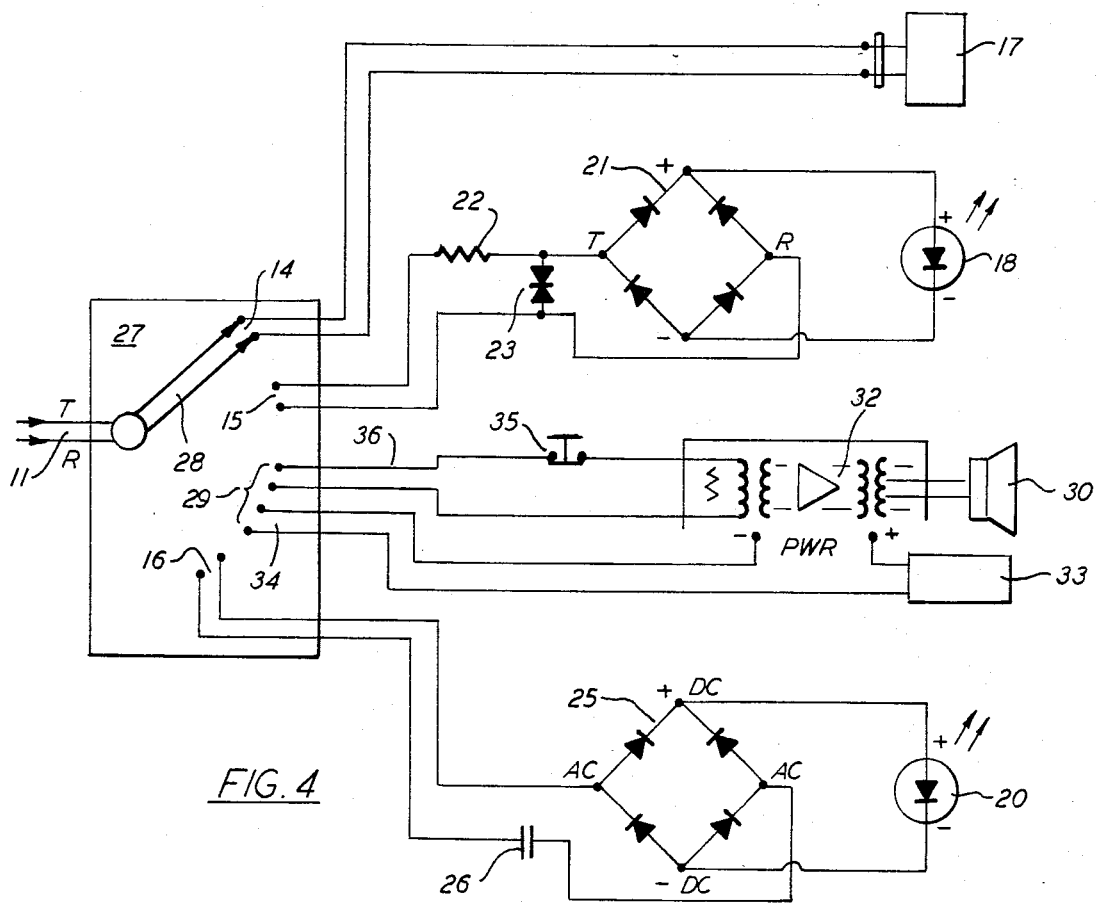
FIG. 4 is a schematic diagram for the embodiment of FIG. 3.
Figure 3:
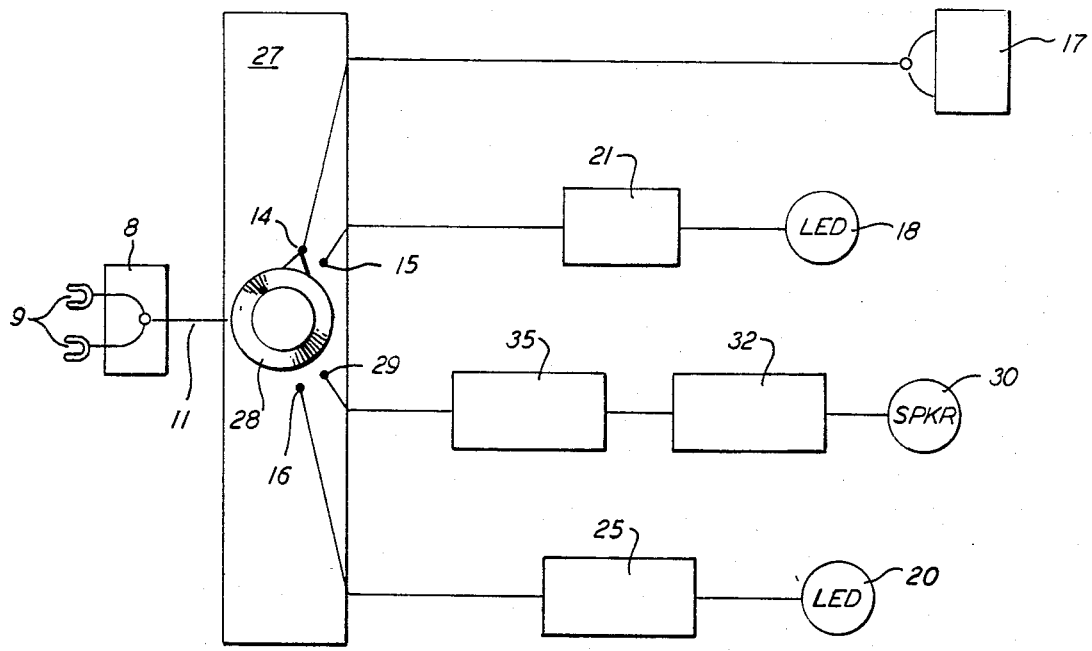
FIG. 3 is a block diagram of another embodiment of the test apparatus of the invention.

FIGS. 3 and 4 illustrate a modified form of the test apparatus in which there is an additional test circuit. The modified apparatus includes a multiple position switch 27 connected as described above to the telephone company's wiring junction 8 through a conducting cord 11. Switch 27 includes a selector knob 28 that can be rotated into four switch positions 14,15,16 and 29. The positions 14,15 and 16 and their associated circuits are the same as described above with reference to the first modification of the test apparatus and hence the same reference numbers are used.

The test circuit connected to the fourth switch position 29 tests for the telephone company dial tone at the wiring junction and also provides for a noise test. Rather than having visual indicators as in the other two test circuits, the dial tone test circuit utilizes an audible indicator in the form of a small magnetic loud speaker 30. When the switch selector knob 28 is moved to the fourth switch position 29, the presence of dial tone at the wiring junction will be indicated by sound emitted from the speaker 30. This means that the telephone company equipment is working properly and that the source of the trouble, i.e. lack of dial tone, is in the customer's equipment. If, on the other hand, no sound is produced when the selector knob is in the fourth switch position 29, it means that the telephone company's dial tone is not being received at the wiring junction and that the customer's equipment is probably not at fault. As is the case with the other test circuits, when the selector knob is moved to the fourth switch position, the customer's wiring and telephones are disconnected from the wiring junction.

With reference to FIG. 4, the switch 27 is a four position, three pole switch and in each of its switch positions 14,15,16 and 29, completes the circuit connected thereto. The dial tone test circuit connected to the fourth switch position 29 includes, in addition to the speaker 30, a one watt audio amplifier 32 preferably having an input of 900 ohm impedance because that matches the average telephone company line being monitored. The amplifier is powered by a DC battery 33, the battery having a normally open circuit 34 that is closed by the three-pole switch when the selector knob is moved to the fourth switch position.

The 900 ohm impedance input (500 ohm resistive) of the amplifier 32 also provides the off-hook condition to seize the telephone company dial tone. In this connection, the circuit is provided with a normally closed push button switch 35 in series with the tip side 36 of the line input to the audio amplifier, the switch being spring biased into the normally closed position. When dial tone is present, it can be removed by depressing the switch 35 twice at a rate of 10 pulses per second and the telephone company line can then be monitored for any unusual line noise. For example, if the customer has a noise problem in his telephone, but the noise is not the same as that coming from the speaker 30, the problem is in his equipment and not that of the telephone company.

If the switch 35 is depressed for approximately one second, it can clear the original dial tone attempt and permit a second try. It should be noted that not being able to break the dial tone by means of this switch could mean that the line is shorted.

From the foregoing description it will be apparent that the invention provides novel test apparatus that is relatively simple and economical to manufacture and, at the same time, can be of considerable benefit to a telephone company customer even though he has no technical training. As will be understood by those familiar with the art, the invention may be embodied in other specific forms without departing from the spirit or essential characteristics thereof.

I claim:

1. A self-contained, independent trouble source locater for use by a telephone customer who owns the telephone instruments and wiring in his home, the trouble source locater being operated by the customer alone without the need for any outside assistance, said wiring originating at a telephone company wiring junction at the customer's house, the wiring junction being connected to an external telephone company line; the trouble source locater comprising a single, multiple position switch connected on one side to the telephone company wiring junction at the customer's house, the switch having a first switch position connected through the customer owned wiring to his telephone instruments, the multiple position switch normally being maintained in its first switch position whereby the telephone instruments are operably connected to the telephone company wiring junction, the multiple position switch having another switch position, and a self-contained ringing test circuit operably connected to said other switch position, the ringing test circuit including means to indicate whether or not the telephone company's bell ringing voltage is being received at the wiring junction, movement of the switch out of its first position and into its other position being operable to disconnect the customer's wiring and telephone instruments from the telephone company wiring junction and to connect the latter to the ringing test circuit, the indicator means in the test circuit being actuated if the telephone company's bell ringing voltage is being received at the wiring junction and failing to be actuated if such voltage is not being received.

2. A trouble source locater as defined in claim 1 wherein the indicator means in the ringing test circuit is a light emitting diode.

3. A trouble source locater as defined in claim 2 wherein the ringing test circuit includes polarity guard means for said light emitting diode.

4. A self-contained, independent trouble source locater for use by a telephone customer who owns the telephone instruments and wiring in his home, the trouble source locater being operated by the customer alone without the need for any outside assistance, said wiring originating at a telephone company wiring junction at the customer's house, the wiring junction being connected to an external telephone company line; the trouble source locater comprising a multiple position switch connected on one side to the telephone company wiring junction, the switch having a first switch position connected through the customer owned wiring to his telephone instruments, the multiple position switch normally being maintained in its first switch position whereby the telephone instruments are operably connected to the telephone company wiring junction, the multiple position switch having a second switch position, a line status test circuit operably connected to the second switch position, the line status circuit including means to indicate the status of the telephone company's line, movement of the switch out of its first position and into its second position being operable to disconnect the customer's wiring and telephone instruments from the telephone company wiring junction and to connect the latter to the line status test circuit, the indicator means in the test circuit being actuated if there is no problem in the telephone company's line and failing to be actuated if there is a problem, the multiple position switch having a third switch position, and a ringing test circuit operably connected to the third switch position, the ringing test circuit including means to indicate whether or not the telephone company's bell ringing voltage is being received at the wiring junction, movement of the switch into its third position being operable to disconnect the customer's wiring and telephone instruments from the telephone company wiring junction and to connect the latter to the ringing test circuit, the indicator means in the ringing test circuit being actuated if the telephone company's bell ringing voltage is being received at the wiring junction and failing to be actuated if such voltage is not being received.

5. A trouble source locater as defined in claim 4 wherein the indicator means in each of the line status test and ringing test circuits is a light emitting diode.

6. A trouble source locater as defined in claim 5 wherein the line status test circuit includes polarity guard means for its light emitting diode.

7. A trouble source locater as defined in claim 5 wherein the ringing test circuit includes a bridge rectifier.

8. A self-contained, independent trouble source locater for use by a telephone customer who owns the telephone instruments and wiring in his home, the trouble source locater being operated by the customer alone without the need for any outside assistance, said wiring originating at a telephone company wiring junction at the customer's house, the wiring junction being connected to an external telephone company line; the trouble source locater comprising a multiple position switch connected on one side to the telephone company wiring junction, the switch having a first switch position connected through the customer owned wiring to his telephone instruments, the multiple position switch normally being maintained in its first switch position whereby the telephone instruments are operably connected to the telephone company wiring junction, the multiple position switch having a second switch position, a line status test circuit operably connected to the second switch position, the line status circuit including means to visually indicate the status of the telephone company's line, movement of the switch out of its first position and into its second position being operable to disconnect the customer's wiring and telephone instruments from the telephone company wiring junction and to connect the latter to the line status test circuit, the visual indicator means in the test circuit being actuated if there is no problem in the telephone company's line and failing to be actuated if there is a problem, the multiple position switch having a third switch position, a ringing test circuit operably connected to the third switch position, the ringing test circuit including means to visually indicate whether or not the telephone company's bell ringing voltage is being received at the wiring junction, movement of the switch into its third position being operable to disconnect the customer's wiring and telephone instruments from the telephone company wiring junction and to connect the latter to the ringing test circuit, the visual indicator means in the ringing test circuit being actuated if the telephone company's bell ringing voltage is being received at the wiring junction and failing to be actuated if such voltage is not being received, the multiple position switch having a fourth switch position, and a dial tone test circuit operably connected to the fourth switch position, the dial tone test circuit including means to audibly indicate whether or not the telephone company's dial tone is being received at the wiring junction, movement of the switch into its fourth position being operable to disconnect the customer's wiring and telephone instruments from the telephone company wiring junction and to connect the latter to the dial tone test circuit, the audible indicator means in the dial tone test circuit being actuated if the telephone company's dial tone is being received at the wiring junction and failing to be actuated if such dial tone is not being received.

9. A trouble source locater as defined in claim 8 wherein the audible indicator means in the dial tone test circuit includes an audio amplifier coupled to a loud speaker.

10. A trouble source locater as defined in claim 8 wherein the dial tone test circuit includes an auxiliary battery power source.

11. A trouble source locater as defined in claim 8 wherein the dial tone test circuit includes a switch that is spring biased into closed position, the spring being operable to momentarily open the dial tone test circuit.

* * * * *